July 15, 1969     T. W. DICKINSON     3,455,614
CRANK BEARING
Filed Jan. 8, 1968     3 Sheets-Sheet 1
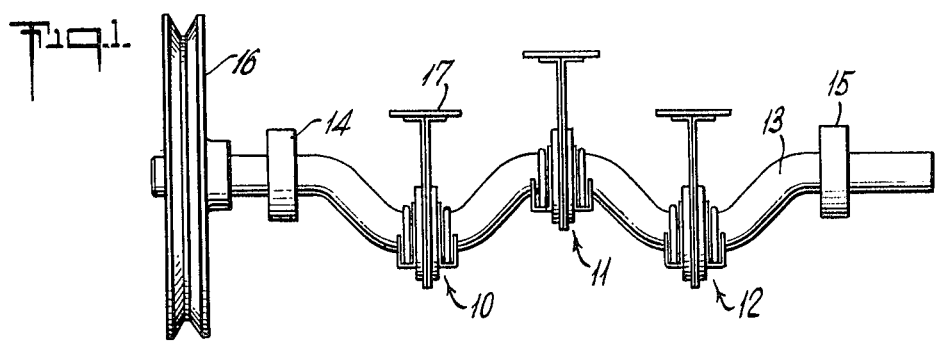
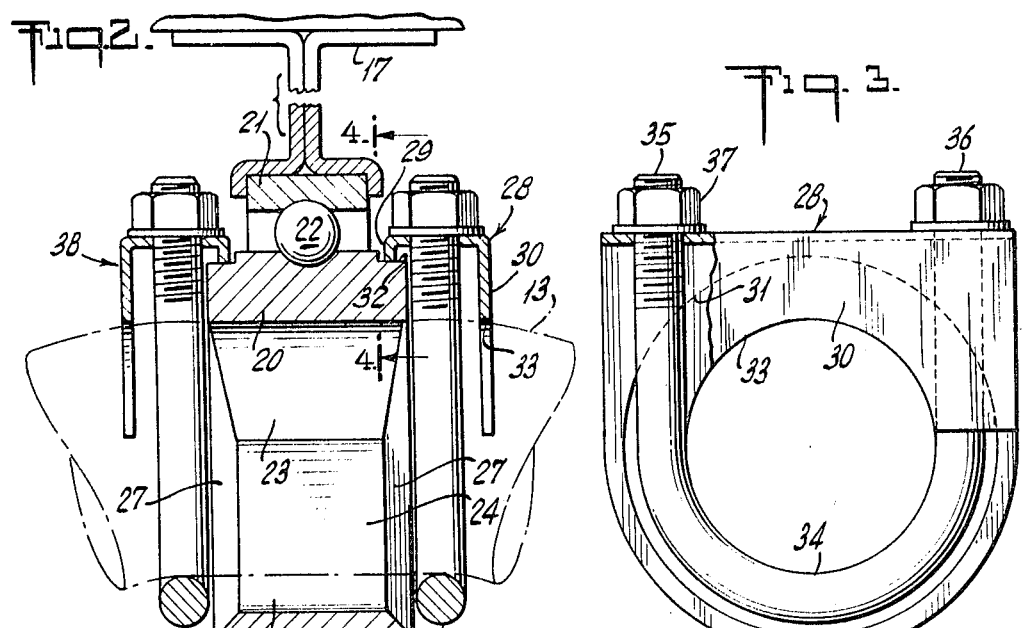
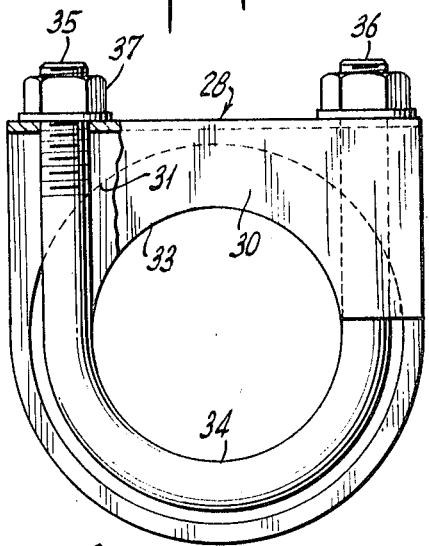
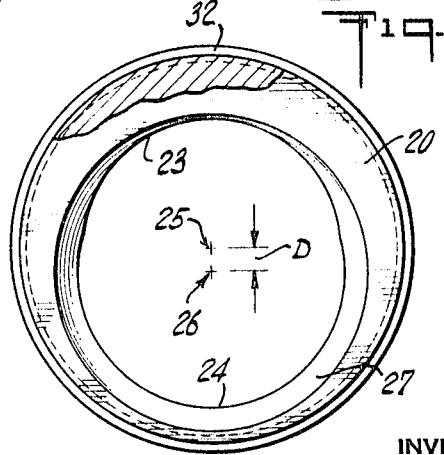
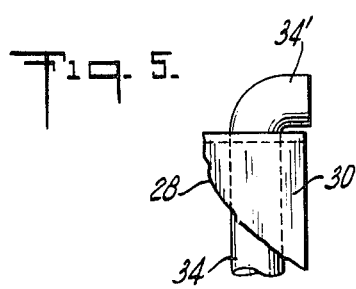
INVENTOR
THORN W. DICKINSON
BY
Hopgood & Calimafde
ATTORNEYS

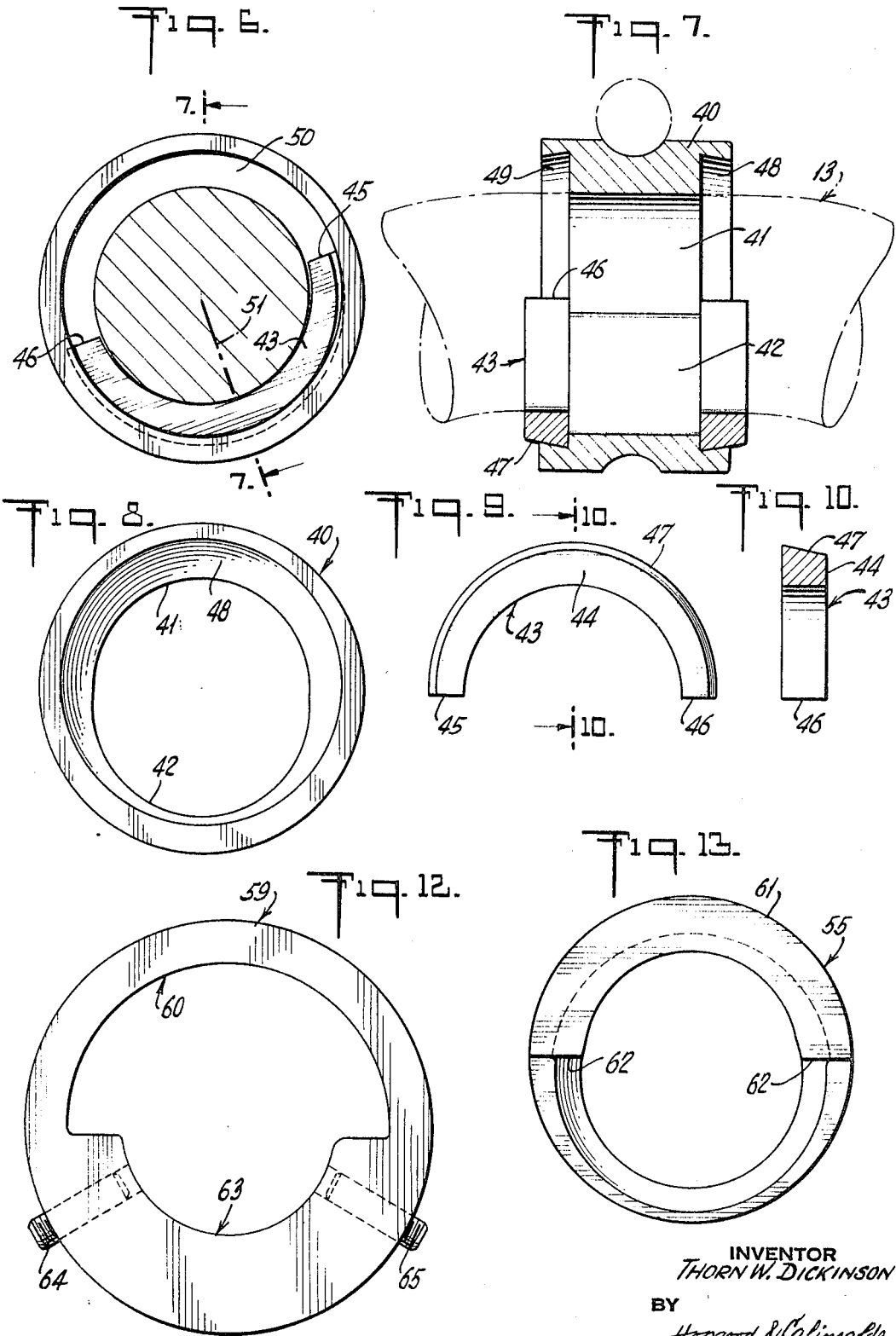

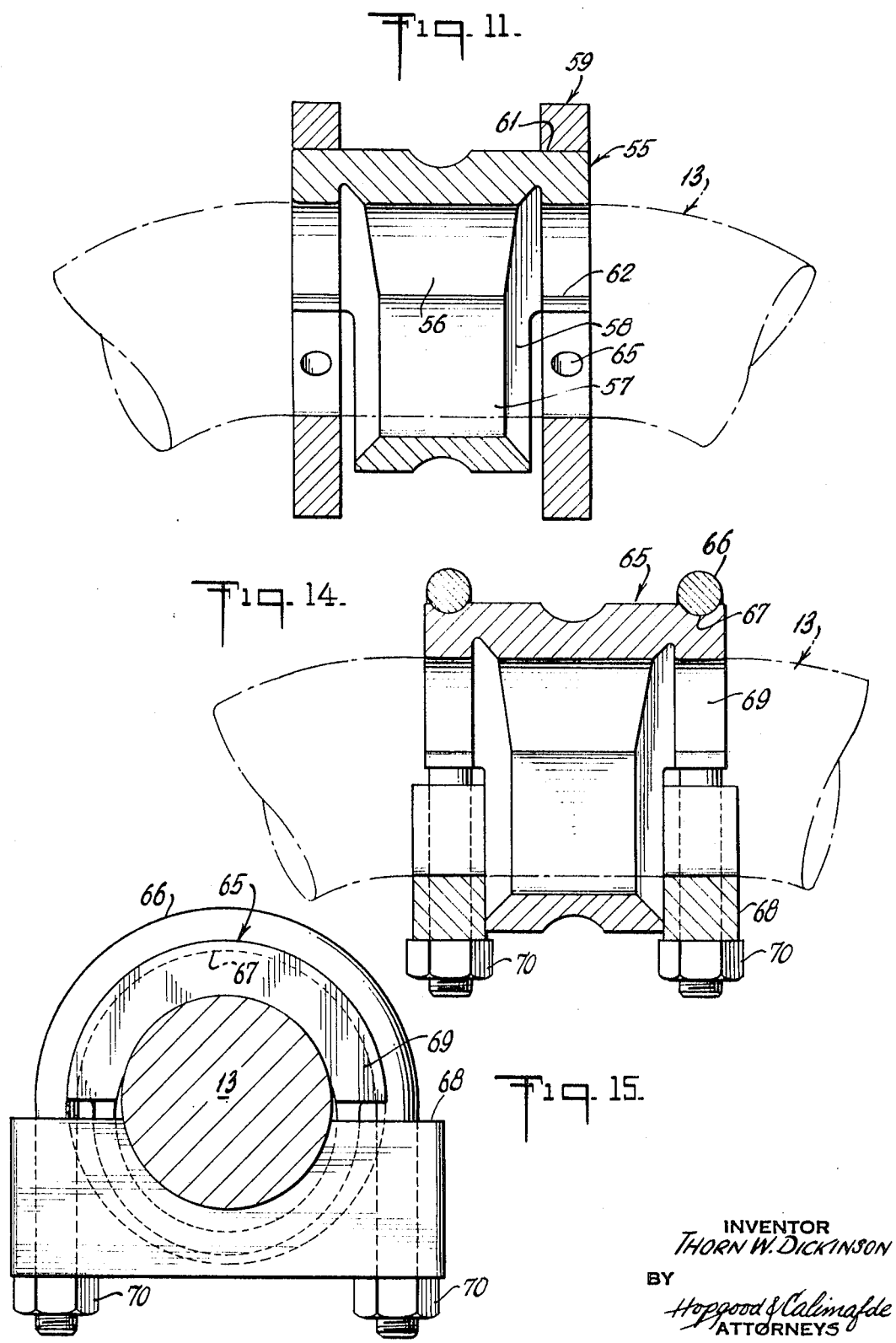

United States Patent Office 3,455,614
Patented July 15, 1969

3,455,614
CRANK BEARING
Thorn W. Dickinson, Berlin, Conn., assignor to The Fafnir Bearing Company, New Britain, Conn., a corporation of Connecticut
Filed Jan. 8, 1968, Ser. No. 696,219
Int. Cl. F16c 3/06, 9/00
U.S. Cl. 308—179                      14 Claims

ABSTRACT OF THE DISCLOSURE

The invention contemplates inherent adaptability of an inner bearing ring to an odd-configurated shaft by a specific internal contouring of the bore of the ring. The outer surface of the ring is devised in the customary manner to provide journal or antifriction support for an outer ring; but, for shaft-support purposes, only a localized arcuate portion of the bore is provided, concentric with the axis of outer-ring support. The rest of the bore is further cut away to a radial extent greater than that of the concentric arcuate bore surface. Enough clearance is thus provided to permit snaking the ring body over an odd-configurated shaft as, for example, the bends of a simple crankshaft. The invention further provides adjustable clamp means reacting between angularly localized parts of the body and the crankshaft for radially inwardly binding the arcuate inner concentric surface to the shaft.

---

This invention relates to an improved bearing construction incorporating clamping means for adjustably setting the bearing in its desired position on a shaft.

In certain applications of bearings, as for example to farm machinery, rugged bearings must be adjustably secured to odd-shaped pieces as, for example, to a crankshaft. Previous attempts to solve such problems involved unduly complicated structure and have imposed undesired machining requirements both as to the bearing and as to the crankshaft itself, with attendant assembly difficulties and other high-cost factors.

It is, accordingly, an object to provide an improved bearing and clamp construction of the character indicated with a view to avoiding or substantially reducing prior undesirable features.

It is a specific object to meet the above object with an improved bearing construction and clamp which is adaptable by endwise insertion over a shaft which may have odd bends, such as the throw of a crankshaft, and which nevertheless will be securely anchored concentric with the desired offset on the crankshaft.

Another specific object is to meet the foregoing objects with a construction in which not only the bearing itself may be inserted endwise as aforesaid, but also the flange, cartridge or other structure into which the bearing may have been embodied or pre-assembled.

A further specific object is to provide an improved crank bearing which inherently makes possible simpler crank construction and simpler assembly, without impairing performance.

Other objects and various further features of novelty and invention will be pointed out or will occur to those skilled in the art from a reading of the following specification in conjunction with the accompanying drawings. In said drawings which show, for illustrative purposes only, preferred forms of the invention:

FIG. 1 is a simplified view in elevation of a multiple-throw crankshaft to which bearings of the invention have been applied;

FIG. 2 is an enlarged vertical sectional view through one of the bearings of FIG. 1;

FIG. 3 is a right-end elevation of clamp structure of FIG. 2, a portion being broken away to reveal internal detail;

FIG. 4 is a right-end elevation of the inner bearing ring of FIG. 2, portions being broken away and sectioned at the plane designated generally 4—4 in FIG. 2;

FIG. 5 is a fragmentary view in end elevation of clamp structure representing a modification of FIG. 3;

FIG. 6 is a right-end elevation of an inner bearing ring as clamped to a shaft by a modified structure of the invention;

FIG. 7 is a vertical sectional view taken generally in the alignment 7—7 of FIG. 6;

FIG. 8 is a right-end elevation of the inner bearing ring of FIG. 6;

FIG. 9 is a right-end elevation of clamping structure utilized in FIGS. 6 and 7;

FIG. 10 is a sectional view taken in the plane 10—10 of FIG. 9;

FIG. 11 is a vertical sectional view of an inner bearing ring and clamp structure according to a further modification;

FIG. 12 is a right-end elevational view of clamp structure of FIG. 11;

FIG. 13 is a right-end elevational view of the inner bearing ring of FIG. 11;

FIG. 14 is a vertical sectional view of still another embodiment of an inner bearing ring and clamp of the invention; and FIG. 15 is a right-end elevation of the clamped inner bearing ring of FIG. 14.

Briefly stated, the invention contemplates inherent adaptability of an inner bearing ring to an odd-configurated shaft by a specific internal contouring of the bore of the ring. The outer surface of the ring is devised in the customary manner to provide journal or antifriction support for an outer ring; but, for shaft-support purposes, only a localized arcuate portion of the bore is provided, concentric with the axis of outer-ring support. The rest of the bore is further cut away to a radial extent greater than that of the concentric arcuate bore surface. Enough clearance is thus provided to permit snaking the ring body over an odd-configurated shaft as, for example, the bends of a simple crankshaft. The invention further provides adjustable clamp means reacting between angularly localized parts of the body and the crankshaft for radially inwardly binding the arcuate inner concentric surface to the shaft. Various forms of the invention will be described and shown.

FIGS. 1 to 4 illustrate a first form. In FIG. 1, three bearings 10–11–12 of the invention have been applied to a simple crankshaft 13, which may be bent with an odd configuration of offsets or crank throws, all from a single rod or shaft. Such a crankshaft may, for example, be of the type used in farm machinery for staggered-phase actuation of straw-rack conveyor elements or the like. Spaced mounting bearings 14–15 may support the crankshaft 13 for rotation on a frame member of the farm machine, and a drive pulley for the crankshaft is shown at 16. Each of the bearing assemblies 10–11–12 is shown complete with flange, cartridge or the like structure for securing the same, as at the mounting flange 17, to a straw-rack element or the like.

The bearing of FIG. 2 is provided with conventional elements such as an inner ring 20, an outer ring 21, and plural antifriction elements 22 riding suitable raceways in the two rings 20–21. The flange structure 17 is seen to comprise like stamped sheet-metal cartridge elements spanning the width of the outer bearing ring 21 and secured as by welding to the permanent relationship shown in FIGS. 1 and 2. The inner ring 20 is preferably of the so-called wide-inner variety so that it may project axially beyond both ends of the outer ring 21.

In accordance with the invention, the bore of the inner ring 20 is provided with two primary contours. The first of these is used for shaft support and is a limited cylindrically arcuate surface 23 concentric with the bearing axis, i.e., with the axis of relative rotation of the inner and outer ring elements 20–21. The arcuate surface 23 is the one by way of which the inner ring 20 will ultimately be located on the desired part of the shaft 13. The rest of the bore of the inner ring 20 must at least be of greater radial extent than the arcuate surface 23, and for ease of manufacture, this remaining portion of the bore is shown formed as a second bore surface 24 of greater radius than the radius of surface 23 and offset from the bearing axis by an amount D (FIG. 4). Further identification in FIG. 4 shows the bearing axis at 25 and the offset axis at 26 (for generation of the surface 24). The extent of the offset D is greater than the amount by which the radius for surface 24 exceeds that for surface 23, and the proportioning of the offset in terms of these two radii is preferably such as to have the arc 23 just less than 180° about the bearing axis 25, with the arc 24 intersecting the arc 23 at its outer limits. To complete the description of the bore, a chamfer or flared counterbore 27 is provided at both axial ends of the bore of the inner ring; this counterbore is preferably generated about the offset axis 26, so as to remove minimum material of the inner ring body at the central portion of the arcuate surface 23, and at the same time to provide maximum clearance for accommodation of crank bends on that side of the bore which is characterized by the larger-radius arc 24.

It will be appreciated that with the bore configuration described in connection with FIGS. 2 and 4, adequate clearance is available to snake the ring 20 (and all that it carries, including the flange or cartridge 17) over a free end of the crankshaft 13 so as to make an initial preassembly of bearings 10–11–12 at their desired offset locations along the length of the crankshaft 13. The conventional bearing 15 is of course added to the preassembly after such insertion of the crank bearings 10–11–12. Having made this pre-assembly, clamp devices of the invention may be set.

In the forms of FIGS. 1 to 4, clamping is achieved by like adjustable tension devices provides at each axial end of the bearing. The clamping devices seat locally upon the exterior of the wide-inner projections and react against the shaft 13, at a substantially diametrically opposite location. In the form shown, each clamp comprises an elongated channel member 28 with spaced upstanding side panels 29–30. The side panel 29 is characterized at 31 by a first arc or circle adapted to the counter of the wide-inner projection, and specifically adapted to fit and ride the surface of a reduced section or land 32 adjacent the axial end of the inner bearing ring 20; preferably, the circular opening or bore 31 is sized for a press-fit assembly of clamp 28 to land 32. Concentric with the recess 31 in panel 29 is a further recess 33 in the panel 30. This further recess preferably conforms substantially to the shaft diameter. The clamp structure is completed by a U-shaped rod member 34, provided with threaded ends 35–36 and adjustably held by bolts as at 37 to the base of the channel 28, at locations spanning the axis of the recesses 31–33. A similar structure is provided at 38, for the other axial end of the inner ring 20. Upon press-fit assembly to ring 20, both clamps are angularly positioned with their channel members 28 symmetrically overstanding and adjacent the concentric support arc 23.

It will be seen that, upon setting the clamp nuts 37, reacting forces are developed between the crankshaft and the inner ring to firmly compress and locate the concentric arcuate surface 23 upon the shaft, leaving at 39 a clearance which does not impair antifriction bearing operation. Symmetry of the mount assures stability, whatever the gyrations occasioned by rotation of the crankshaft 13.

FIG. 5 illustrates a slight modification for the clamp of FIG. 3 wherein one end of the U-shaped member 34 is bent at 34' for self-location and reference against the bottom of the channel 28. The other end of the U-shaped member is as described in FIG. 3, namely, being threaded and adjustably secured by nut 37. Thus, in such a modification, only one nut 37 need be set for each axial-end clamp.

In the modification of FIGS. 6 to 10, similar clamping forces are developed, utilizing compressional rather than tension techniques. The inner ring is identified at 40 and is provided with a concentric arcuate bore surface 41 and with an offset enlarged bore surface 42, as already described in connection with surfaces 23–24 in FIGS. 2 and 4. The compressional device utilized for clamping is an angular wedge, shown separately in FIGS. 9 and 10 and identified generally as the part 43. The wedge 43 is generally semicyclindrical, with a central body portion 44 of greater radial extent than either of the outer limits 45–46. Also the outer surface 47 of the wedge 43 is tapered for a retaining purpose which will become clear.

To achieve wedge action, for securing the ring 40 to the shaft 13, the wide-inner ring projections are counterbored at 48–49 with an eccentric offset, such offset being away from the bearing axis and in the direction opposite that used to generate the surface 42. Also, the counterbores 48–49 are preferably undercut to match the slope of the wedge surface 47.

Assembly of the structure of FIGS. 6 to 10 is accomplished in much the same manner as described for FIGS. 1 to 4, in that the complete bearing including inner ring 40 is first snaked along the length of the crankshaft 13 to the desired mounting location. At this point, the wedges may be inserted, as at the upper clearance space denoted 50 in FIG. 6, whereupon they are rotated about the bearing axis (with respect to the inner ring 50) to a point where jamming occurs. Such point occurs for the showing of FIG. 6 at a location identified by the radial direction 51. Of course, the approach direction for wedging should be selected such that any tendency for planetary creep of inner ring 40, upon crankshaft rotation, is opposed by tighter wedge action.

In the arrangement of FIGS. 11 to 13, a further tension-type clamp is shown applied to a wide-inner bearing ring 55 having a first concentric arcuate surface 56 and a second enlarged bore surface 57, in the manner already described for other forms. The axial limits of these surfaces are defined by the undercut equivalent of a chamfer, designated 58, the same being equivalent to the chamfer 27 in FIG. 2. Endwise assembly over the odd-bend configurations of shaft 13 is accomplished as previously described, and when in the selected position on shaft 13, like tension clamps of the nature shown at 59 in FIG. 12 are applied over the axial ends of the inner ring 55.

Each clamp 59 is shown to be circumferentially continuous and with a central cutout having a first generally semi-cylindrical surface 60 of radius matching that of the projecting axial end 61 of the inner ring 55. This semi-cylindrical cutout 60 also substantially matches the limited arcuate extent of the wide inner projection 61, the limits of that extent being designated 62 in FIGS. 11 and 13. The remainder of the clamping ring cutout has a contour 63 of lesser radius substantially matching that of the shaft 13. Spaced set screws 64–65 in the ring 59 provide wide-based adjustment of the tension in the clamp ring 59, the same being referenced on the shaft 13 essentially diametrically opposite the location 61 at which the ring 59 compresses the wide inner ring 55 to the opposite side of the shaft.

In the embodiment of FIGS. 14 and 15, the structure is generally the same as described for FIGS. 11 to 13, except that a U-shaped clamp rod 66 is employed, with the bottom of each U located in a peripheral groove 67, contoured to the rod 66 and adjacent an axial end of the wide inner ring 65. A solid yoke 68, in the plane of the wide-inner projection 69, is shown contoured for reaction against the opposite side of the shaft 13 when adjusting nuts 70 are fastened at the free ends of the U-shaped rod 66.

It will be seen that I have described improved bearing and clamp structures which are basically simple in concept and in application. My devices make it possible to employ the very simplest and least expensive crankshaft constructions and to assemble complete bearing subassemblies with attached flanges to plural odd offsets in a single-piece crankshaft. The stability of each mounted bearing assures true running, without impairing antifriction bearing efficiency.

What is claimed is:

1. An inner ring for an antifriction bearing or the like, comprising an annular body having an outer peripheral surface adjacent one axial end of said body, a bearing surface intermediate said surface and the other end of said body to support relative rotation of an outer bearing ring, the bore of said body including a first cylindrically arcuate surface concentric with the rotary axis of said bearing surface, the remaining surface of the bore being radially outside the radius of said arcuate surface and being of at least the angular extent of said arcuate surface, and clamp means including a part locating on said peripheral surface and a diametrically opposite part adapted to engage a shaft supporting said arcuate surface.

2. The ring of claim 1, in which said body has a second outer peripheral surface adjacent said other end, with said bearing surface intermediate said peripheral surfaces, and second clamp means including a part locating on said second peripheral surface and a diametrically opposite part adapted to engage the shaft.

3. The ring of claim 1, in which said clamp includes an elongated channel having two upstanding side panels, one of said panels having a bore matching and press-fitted to the adjacent peripheral surface of said body, the other of said panels being arcuately contoured along its outer edge to substantially the radius of said arcuate bore surface, both contours being arcuate about substantially the same axis.

4. The ring of claim 3, in which said clamp further includes a U-shaped member of curvature to embrace the shaft and with both arms connected to said channel on opposite longitudinal sides of the axis of said arcuately contoured edges.

5. An inner ring for an antifriction bearing or the like, comprising an annular body having an external radially outwardly facing bearing surface intermediate the axis ends of said body to support relative rotation of an outer bearing ring, the bore of said body including a first cylindrically arcuate surface concentric with the rotary axis of said bearing surface, the remaining surface of the bore being radially outside the radius of said arcuate surface and being of at least the angular extent of said arcuate surface, and clamp means including a first part locating on the radially outer face of said body adjacent one axial end and a second part adapted to engage a shaft supporting said arcuate surface, at a location effectively diametrically opposite said first part.

6. A ring according to claim 5, in which said clamp means is adjustable to compress said arcuate surface against the shaft.

7. An inner ring for an antifriction bearing or the like, comprising a bored annular body having internal and external concentric surfaces between axial ends, the outer one of said surfaces including a bearing surface to support relative rotation of an outer bearing ring, said inner concentric surface being of limited arcuate extent and thus defining a first part of the bore of said body, the remaining surface of the bore being radially outside the radius of said arcuate inner concentric surface, and adjustable clamp means reacting between angularly localized parts of said body and an inserted shaft for radially inwardly binding said arcuate inner concentric surface to the shaft.

8. The ring of claim 7, in which said clamp means includes compressional loading means spanning one axial end of the outer surface of said body and a substantially diametrical opposed part of the shaft.

9. The ring of claim 7, in which said remaining surface is also cylindrically arcuate, but with a second radius greater than that of said first-mentioned arcuate surface and about an axis parallel to but offset from the axis of said first-mentioned arcuate surface to an extent less than the extent by which said second radius exceeds said first radius.

10. The ring of claim 9, in which the relation of said first and second radii and said offset are such as to establish said first arcuate surface less than, and said second arcuate surface greater than, 180° about the bearing axis.

11. The ring of claim 7, in which the axial ends of the ring-body bore are peripherally continuously chamfered about said offset axis.

12. The ring of claim 7, in which said clamp means includes an angular wedge having a concave shaft-engaging surface and a convex ring-bore engaging surface.

13. The ring of claim 12, in which the bore of said body includes a wedge-receiving counterbore at one axial end.

14. The ring of claim 12, in which the bore of said body is undercut at a wedge-receiving and retaining counterbore at one axial end.

References Cited
UNITED STATES PATENTS 2,990,224   6/1961   Rozner _____ 308—236

MARTIN P. SCHWADRON, Primary Examiner

FRANK SUSKO, Assistant Examiner